(12) United States Patent
Yamauchi et al.

(10) Patent No.: US 7,058,279 B2
(45) Date of Patent: Jun. 6, 2006

(54) SPECIAL REPRODUCTION DATA GENERATING DEVICE, MEDIUM AND INFORMATION AGGREGATE

(75) Inventors: Kenichiro Yamauchi, Nagaokakyo (JP); Junichi Komeno, Osaka (JP); Yoshitaka Yaguchi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1266 days.

(21) Appl. No.: 09/821,985

(22) Filed: Mar. 30, 2001

(65) Prior Publication Data

US 2001/0026676 A1 Oct. 4, 2001

(30) Foreign Application Priority Data

Mar. 30, 2000 (JP) ............................. 2000-094893

(51) Int. Cl.
*H04N 5/91* (2006.01)
*H04N 7/26* (2006.01)

(52) U.S. Cl. ........................ 386/68; 386/109

(58) Field of Classification Search ................ 386/68, 386/67, 76, 81, 82, 6, 7, 109, 111, 112, 27, 386/33
See application file for complete search history.

(56) References Cited

U.S. PATENT DOCUMENTS

| | | | |
|---|---|---|---|
| 5,377,051 A * | 12/1994 | Lane et al. .................... 386/81 |
| 5,410,350 A | 4/1995 | Kato et al. | |
| 5,566,174 A | 10/1996 | Takashi et al. | |
| 5,596,581 A | 1/1997 | Takashi et al. | |
| 5,793,927 A | 8/1998 | Lane | |
| 5,832,172 A | 11/1998 | Jeon | |
| 5,838,678 A | 11/1998 | Davis et al. | |
| 5,859,660 A | 1/1999 | Perkins et al. | |
| 5,946,446 A | 8/1999 | Yanagihara | |
| 5,966,387 A | 10/1999 | Cloutier | |
| 6,031,960 A | 2/2000 | Lane | |
| 6,041,068 A | 3/2000 | Rosengren et al. | |

FOREIGN PATENT DOCUMENTS

| | | |
|---|---|---|
| EP | 549813 | 7/1993 |
| EP | 0 737 975 A | 10/1996 |
| EP | 0897 245 A | 2/1999 |
| JP | 5-276506 | 10/1993 |
| JP | 09-121322 | 5/1997 |
| JP | 10-108178 | 4/1998 |
| JP | 11-264521 | 9/1999 |
| JP | 2000-41218 | 2/2000 |
| WO | WO 97 40623 A | 10/1997 |

OTHER PUBLICATIONS

Japanese Office Action dated Jul. 30, 2002 for Japanese application No. 2000-094893 (w/ partial English translation).
European Search Report for Application No. 01 10 8184 issued Dec. 19, 2003.

* cited by examiner

*Primary Examiner*—Robert Chevalier
(74) *Attorney, Agent, or Firm*—RatnerPrestia

(57) ABSTRACT

A special reproduction data generating device is provided. An MPEG transport stream is input to the special reproduction data generating device. The device includes a special reproduction data generator for directly generating special reproduction data by selecting a transport packet including data of a predetermined kind of frame from transport packets of the MPEG transport stream, without converting the inputted MPEG transport stream to an ES (elementary stream) or PES (packetized elementary stream). The special reproduction data generating device outputs the special reproduction data as an MPEG transport stream.

15 Claims, 6 Drawing Sheets

SPECIAL REPRODUCTION DATA GENERATING DEVICE, MEDIUM AND INFORMATION AGGREGATE

BACKGROUND OF THE INVENTION

1. Field of the Invention

The present invention relates to a special reproduction data generating device for generating special reproduction data from an MPEG transport stream and to a program recording medium a recording medium, a medium, and an information on aggregate.

2. Related Art of the Invention

Special reproduction such as cue and review as well as normal-speed reproduction is performed on AV data, which is based on MPEG transport streams recorded in a medium including a tape medium such as digital VTR.

Such special reproduction is conducted as in the following. Namely, a special reproduction data area is provided on a track locus of a tape medium such as digital VTR, and special reproduction data is recorded in the data area. As for the special reproduction data, when AV data serving as an MPEG transport stream is recorded in the tape medium, some or all pictures of the AV data are extracted and are recorded in the special reproduction data area as transport packets of the MPEG transport stream.

In other words, in order to realize special reproduction using a tape medium, it is necessary to generate special reproduction data from an MPEG transport stream recorded in a tape medium.

Further, special reproduction as well as normal-speed reproduction is carried out on AV data, which is generated based on an MPEG transport stream recorded in a device such as a hard disk permitting random access.

Such special reproduction is performed as follows: namely, upon recording AV data in a magnetic disk medium, special reproduction information is generated which is indicative of recording positions of all or some I pictures used for special reproduction, and the information is recorded in the magnetic disk medium with the AV data. And then, upon special reproduction, only I pictures used for special reproduction are read from the special reproduction information, are converted into an MPEG transport stream, and are outputted.

As described above, in case of recording AV data in a device such as a digital VTR performing sequential access and in case of recording AV data in a device such as a hard disk performing random access, when recording AV data generated based on an MPEG transport stream, it is necessary to generate special reproduction data to perform special reproduction.

Referring to FIGS. 5 and 6, the following will discuss a conventional image processing device for generating special reproduction data from an inputted MPEG transport stream.

FIG. 5 is a block diagram showing the configuration of a conventional image processing device 60.

The image processing device 60 is configured by an input section 61, a picture selecting section 62, a first conversion section 63, a buffer 64, a picture processing section 65, a second conversion section 66, and an output section 67.

The input section 61 is FIFO (First In First Out) for inputting an MPEG transport stream.

The picture selecting section 62 is a means of selecting pictures used for special reproduction.

The first conversion section 63 is a means of removing a header from a transport packet of selected pictures and making a conversion to an ES(elementary stream) or PES (packetized elementary stream).

Special reproduction discontinuously extracts pictures, so that selected pictures have a mismatch on MPEG SYNTAX in a PTS, DTS and so on.

The buffer 64 is a buffer for accumulating a converted ES or PES and is FIFO having a capacity for storing at least several tens of packets.

The picture processing section 65 is a means of performing processing such that a converted ES or PES matches MPEG SYNTAX.

The second conversion section 66 is a means of adding a header to a processed ES or PES and making a conversion to an MPEG transport stream.

The output section 67 is a means of outputting an MPEG transport stream for special reproduction.

The following will discuss the operation of the conventional image processing device 60 configured as above.

FIG. 6 shows the steps of generating special reproduction data in the image processing device 60. In the image processing device 60, an MPEG transport stream is converted to an ES or PES, an ES or PES is generated for special reproduction, the ES or PES is accumulated in a buffer, and the ES or PES is converted to an MPEG transport stream for special reproduction.

Namely, the input section 61 inputs an original MEPG transport stream from which special reproduction data is generated, and conveys transport packets to the picture selecting section 62.

The picture selecting section 62 selects transport packets having data of pictures used for special reproduction. For example, in the case where pictures are displayed at a rate of 30 frames per second in normal reproduction, if the sixfold-speed special reproduction is performed, pictures used for special reproduction are selected every 5 frames. In other words, transport packets are selected which include data of a selected I frame. When a transport packet including an I frame is selected from MPEG2 transport packets, pictures are selected discontinuously, so that the selected transport packets do not match MPEG SYNTAX.

Hence, the first conversion section 63 removes a header from the selected transport packet and makes a conversion to an ES or PES.

The buffer 64 accumulates the converted ES or PES.

The picture processing section 65 performs processing such that the converted ES or PES matches to the SYNTAX of MPEG.

The second conversion section 66 divides the processed ES or PES, adds a header thereto to reconstruct the transport packet, and makes a conversion to an MPEG transport stream.

The output section 67 outputs the MPEG transport stream for special reproduction.

The conventional image processing device 60 generates special reproduction data as described above.

However, in the image processing device 60, which is a conventional device for generating special reproduction data, an MPEG transport stream is temporarily converted to an ES or PES, special reproduction data is generated, and then the ES or PES is converted back to an MPEG transport stream. Therefore, header information removed for converting an MPEG transport stream to an ES or PES is different from header information added for converting an ES or PES to an MPEG transport stream. Thus, information on a transmission line and so on may be lost, which is included in transport packets of the original MPEG transport stream.

Namely, the conventional special reproduction data generating device may lose information on a transmission line. The information is included in an original MPEG transport stream from which special reproduction data is generated.

Moreover, upon processing pictures, picture information included in an MPEG transport stream changes in size. Further, when a transport stream is converted to an ES or PES, matching of data is lost between a conveyed transport packet and an ES or PES included therein. Therefore, the number of transport packets considerably changes before and after processing. The capacity of the buffer needs to be larger to compensate for a difference between input and output.

Namely, a buffer with a large capacity is necessary for generating special reproduction data.

Also, it is difficult to change a transfer rate of an MPEG transport stream in real time, which is outputted as special reproduction data.

Further, some packets are composed of non-video data such as audio and subtitles, and padding and so on are omitted in a conversion to an ES or PES. Hence, latency is not constant from the time an MPEG transport stream is inputted until the time special reproduction data is outputted, and the latency varies according to the content of the packets.

SUMMARY OF THE INVENTION

The object of the present invention is to provide a special reproduction data generating device, a transmitting medium a recording medium, a medium, and an information aggregate that does not lose information on a transmission line, the information being included in an original MPEG transport stream from which special reproduction data is generated, considering that the conventional special reproduction data generating device may lose information on a transmission line, the information being included in an original MPEG transport stream from which special reproduction data.

Moreover, the object of the present invention is to provide a special reproduction data generating device, a transmitting medium, a recording medium, a medium, and an information aggregate that eliminates the need for a large-capacity buffer to generate special reproduction data, considering that a buffer with a large capacity is necessary for generating special reproduction data.

Furthermore, the object of the present invention is to provide a special reproduction data generating device, a transmitting medium, a recording medium, a medium, and an information aggregate that can readily change a transfer rate of an MPEG transport stream outputted as special reproduction data, considering that it is difficult to change a transfer rate of an MPEG transport stream outputted as special reproduction data.

Additionally, the object of the present invention is to provide a special reproduction data generating device, a transmitting medium, a recording medium, a medium, and an information aggregate that can suppress a change in latency from the time an MPEG transport stream is inputted until the time special reproduction data is outputted, considering that a latency is not constant from the time an MPEG transport stream is inputted until the time special reproduction data is outputted, and a latency varies according to the content of pictures.

One aspect of the present invention is a special reproduction data generating device, comprising:

input means of inputting an MPEG transport stream;

special reproduction data generating means of directly generating special reproduction data by selecting a transport packet including data of a predetermined kind of frame from transport packets of the MPEG transport stream, without converting the inputted MPEG transport stream to an ES (elementary stream) or PES (packetized elementary stream) and output means of outputting the special reproduction data as an MPEG transport stream.

Another aspect of the present invention is the special reproduction data generating device wherein the special reproduction data generating means adds Presentation Time Stamp (PTS), which is used for special reproduction, to the selected transport packet, and corrects a mismatching MPEG format so as to generate the special reproduction data.

Still another aspect of the present invention is the special reproduction data generating device wherein the special reproduction data generating means also adds Decoding Time Stamp (DTS) to the selected transport packet.

Yet another aspect of the present invention is the special reproduction data generating device wherein said special reproduction data generating means sets a Broken_link bit for the selected transport packet.

Still yet another aspect of the present invention is the special reproduction data generating device wherein the correction of the mismatching MPEG format means that if the selected transport packet includes data unnecessary or useless for special reproduction, the data is defined as a padding byte and made dummy data.

A further aspect of the present invention is the special reproduction data generating device wherein the unnecessary or useless data is at least one of data of a frame other than the predetermined kind of frame, and DIT, PCR, PSI, DSM flag, PTS, DTS, and data of an AC coefficient of a macro block that are added to the inputted MPEG transport stream.

A still further aspect of the present invention is the special reproduction data generating device wherein the correction of the mismatching MPEG format means that in the case where the data necessary for special reproduction is not added to the selected transport packet, another transport packet is inserted before or after the selected transport packet, and the necessary data is stored in the selected transport packet or the additionally inserted transport packet, and if the necessary data is stored in the selected transport packet, the additionally inserted transport packet stores data which cannot be stored in the selected transport packet since the selected transport packet stores the necessary data.

A yet further aspect of the present invention is the special reproduction data generating device wherein the correction of the mismatching MPEG format means that if the data necessary for special reproduction is added to the selected transport packet but a value thereof is incompatible, the value is corrected.

A still yet further aspect of the present invention is the special reproduction data generating device wherein the necessary data is at least one of PCR, PSI, a DSM flag, PTS, DTS, a sequence header code, a sequence end code, a GOP header, a Broken_link bit that are provide for the special reproduction.

An additional aspect of the present invention is the special reproduction data generating device wherein the predetermined frame is an I picture.

A still additional aspect of the present invention is the special reproduction data generating device wherein the predetermined frame is at least one picture selected from an I picture, a P picture, and a B picture.

A yet additional aspect of the present invention is a medium storing a program and/or data for allowing a computer to carry out all or some functions of all or some means of the special reproduction data generating device the medium being processible by a computer.

A still yet additional aspect of the present invention is an information aggregate comprising a program and/or data for allowing a computer to carry out all or some functions of all or some means of the special reproduction data generating device.

A supplementary aspect of the present invention is a transmitting medium for transmitting an MPEG transport stream generated in the special reproduction data generating device according to any one of 1st to 11th inventions.

A still supplementary aspect of the present invention is a recording medium for recording an MPEG transport stream generated in the special reproduction data generating device.

DESCRIPTION OF SYMBOLS

Figure 1:
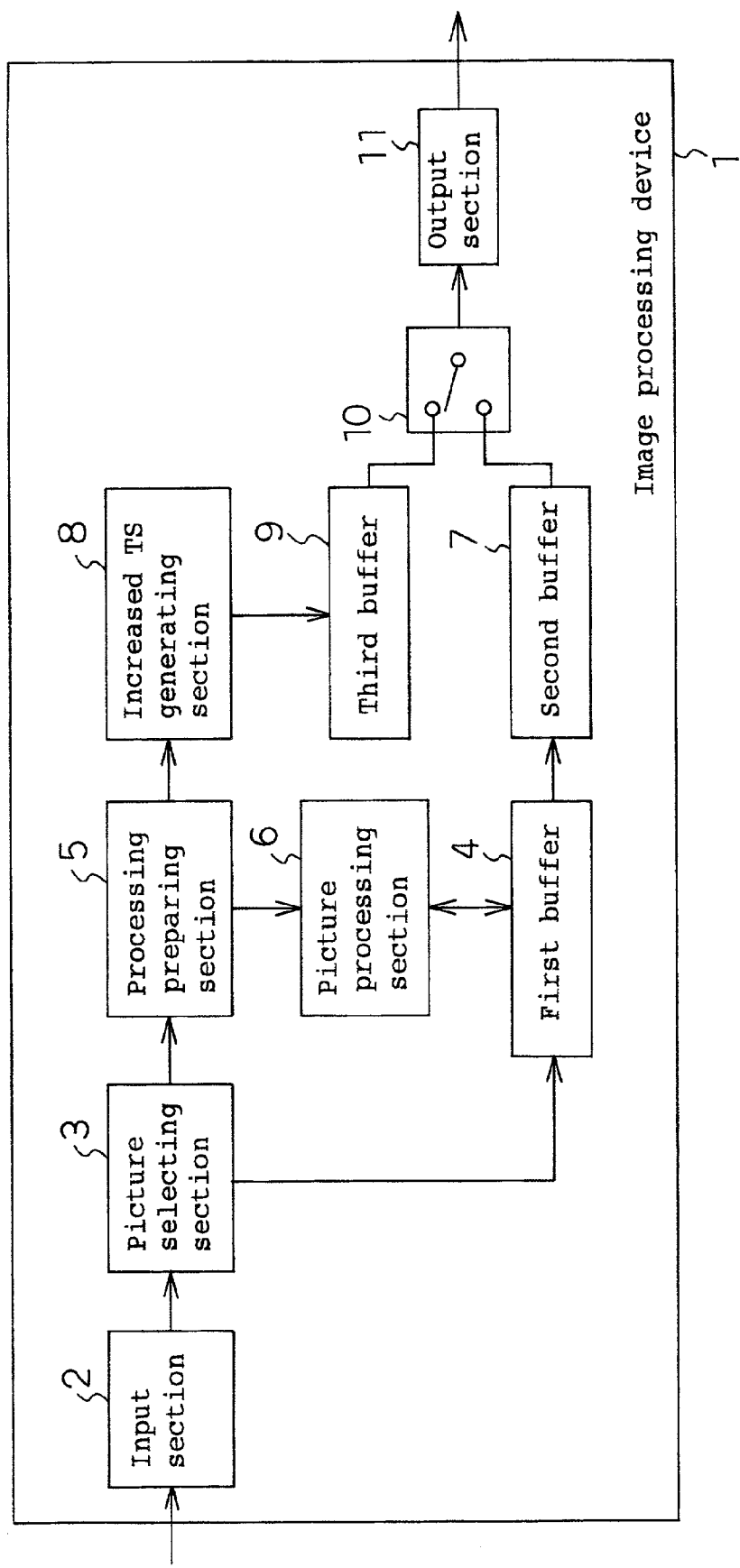
FIG. 1 is a block diagram showing the configuration of an image processing device according to Embodiment 1 of the present invention.

| | |
|---|---|
| 1 | Image processing device |
| 2 | Input section |
| 3 | Picture selecting section |
| 4 | First buffer |
| 5 | Processing preparing section |
| 6 | Picture processing section |
| 7 | Second buffer |
| 8 | Increased TS generating section |
| 9 | Third buffer |
| 10 | Transfer switch |
| 11 | Output section |
| 21 to 24 | Processing |
| 30, 33, 37, 40, 43 | Transport packet |
| 31, 34, 38, 41, 44 | Header |
| 32, 35, 39, 42, 45 | Image data |
| 36, 46 | Dummy data |
| 60 | Image processing device |
| 61 | Input section |
| 62 | Picture selecting section |
| 63 | First conversion section |
| 64 | Buffer |
| 65 | Picture processing section |
| 66 | Second conversion section |
| 67 | Output section |

PREFERRED EMBODIMENTS OF THE INVENTION

Referring to the drawings, the following will describe an embodiment of the present invention.

Embodiment 1

First, Embodiment 1 will be explained.

FIG. 1 is a block diagram showing the configuration of an image processing device 1 of this embodiment.

The image processing device 1 is configured by an input section 2, a picture selecting section 3, a first buffer 4, a processing preparing section 5, a picture processing section 6, a second buffer 7, an increased TS generating section 8, a third buffer 9, a transfer switch 10, and an output section 11.

The input section 2 is FIFO (First In First Out) for inputting an MPEG transport stream.

Here, MEPG stands for Motion Picture Expert Group, and MPEG2 is a standard with ISO/IEC standard number 13818.

The picture selecting section 3 is a means of selecting a transport packet including pictures used for special reproduction.

The first buffer 4 is a buffer for storing a single transport packet.

The processing preparing section 5 is a means of preparing for processing a transport packet.

The picture processing section 6 is a means of processing a stream, which is selected for special reproduction, for each of the transport packets, and matching the MPEG transport stream to MPEG2 SYNTAX.

The second buffer 7 is a buffer for storing a transport packet which is formed by processing a transport packet stored in the first buffer.

The increased TS generating section 8 is a means of generating another transport packet when information about pictures is increased by processing a transport packet.

The third buffer 9 is a buffer for storing additionally generated transport packet.

The transfer switch 10 is a transfer switch for switching transport packets outputted from the second buffer 7 and the third buffer 9.

The output section 11 is a means of outputting an MPEG transport stream for special reproduction.

Here, the input section 2 of this embodiment is an example of an input means of the present invention. The picture selecting section 3, the first buffer 4, the processing preparing section 5, the picture processing section 6, the second buffer 7, the increased TS generating section 8, the third buffer 9, and the transfer switch 10 of this embodiment are examples of special reproduction data generating means of the present invention. The output section 11 of this embodiment is an example of an output means of the present invention. Additionally, the image processing device 1 of this embodiment is an example of the special reproduction data generating device of the present invention.

Next, the following will discuss the operation of the above-mentioned image processing device 1 of this embodiment.

Figure 2:
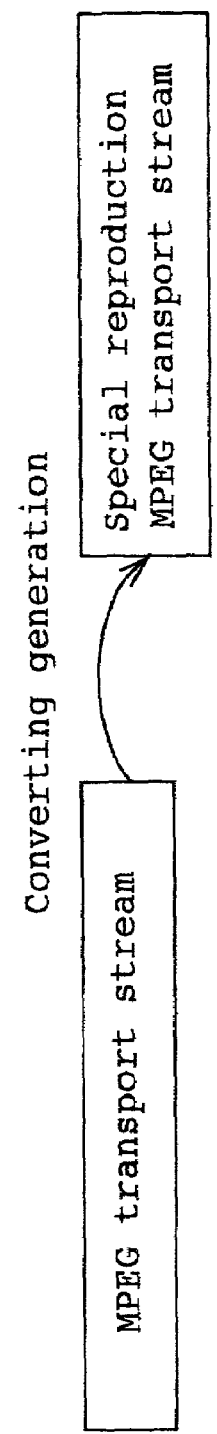
FIG. 2 is a diagram showing the steps of generating special reproduction data in the image processing device according to Embodiment 1 of the present invention.

FIG. 2 shows the step of generating special reproduction data in the image processing device 1. The image processing device 1 converts an MPEG transport stream to an MPEG transport stream for special reproduction, without converting the MPEG transport stream to an ES or PES.

Figure 3:
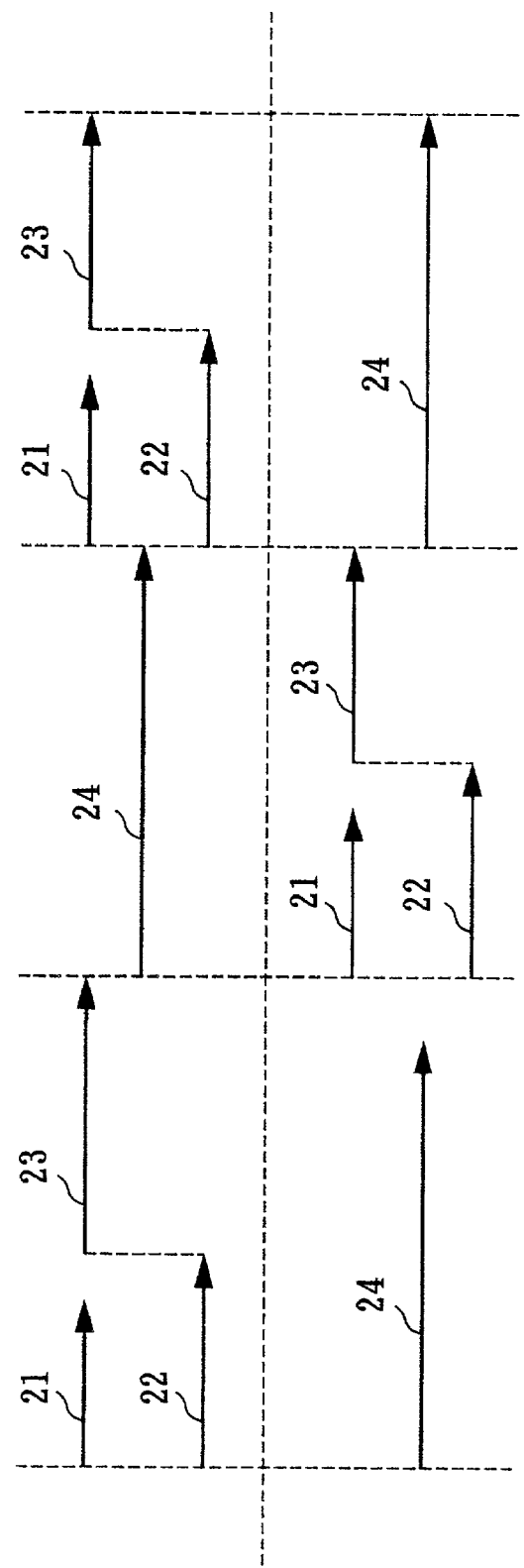
FIG. 3 is a time chart showing that special reproduction data is generated in the image processing device according to Embodiment 1 of the present invention.

FIG. 3 is a time chart showing the processing of the image processing device 1. In FIG. 3, time elapses from left to right. The image processing device 1 of this embodiment performs a pipeline processing shown in FIG. 3.

First, the input section 2 inputs an original MEPG transport stream from which special reproduction data is generated, and the input section 2 successively conveys transport packets to the picture selecting section 3.

The picture selecting section 62 selects transport packets having data of pictures used for special reproduction. For example, in the case where pictures are displayed at a rate of 30 frames per second in normal reproduction and five-fold-speed special reproduction is performed, pictures used for special reproduction are selected every 15 frames. In other words, transport packets are selected which include data of a selected I picture. When the picture selecting section 3 selects one of the transport packets, the first buffer 4 stores the transport packet. In FIG. 3, processing 21 represents the processing of the input section 2 and the picture selecting section 3.

A series of selected transport packets, which are transport packets including I pictures selected from an MPEG2 transport stream, do not match MPEG SYNTAX. Namely, information necessary for MPEG SUNTAX is lost, or information unnecessary for special reproduction or information to be rewritten is still added.

What information is lost and what information is unnecessary for special reproduction or needs rewriting will be discussed further later on.

Here, the processing preparing section 5 analyzes the transport packets selected by the picture selecting section 3, finds a part which does not match MPEG SYNTAX, generates information about how to process the transport packets, and conveys the information to the picture processing section 6 and the increased TS generating section 8. In FIG. 3, processing 22 represents the processing of the processing preparing section 5.

The picture processing section 6 processes the transport packet stored in the first buffer 4. First, when the transport packets include PTS (Presentation Time Stamp), the PTS is replaced for special reproduction. The processed transport packet is stored in the second buffer 7.

Figure 4:
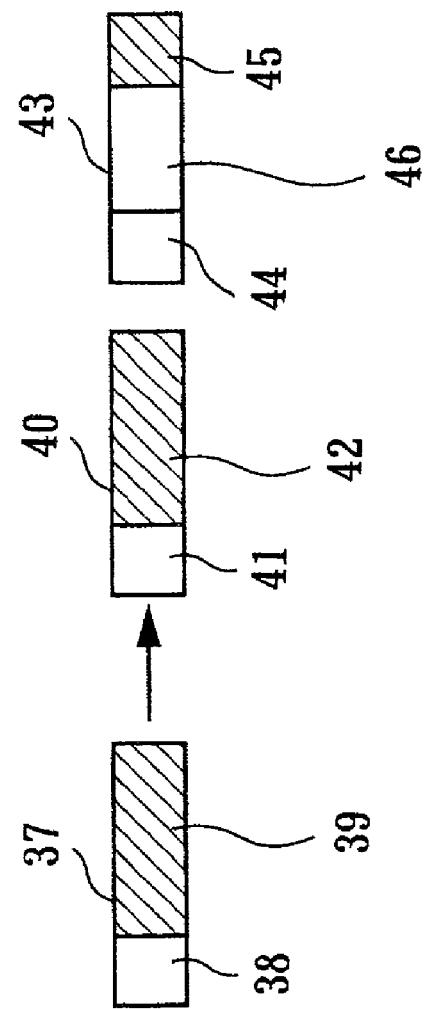
FIG. 4 is a diagram showing that two transport packets are formed, which include a transport packet stored in a first buffer before processing and a transport packet having picture information increased after processing.
Figure 5:
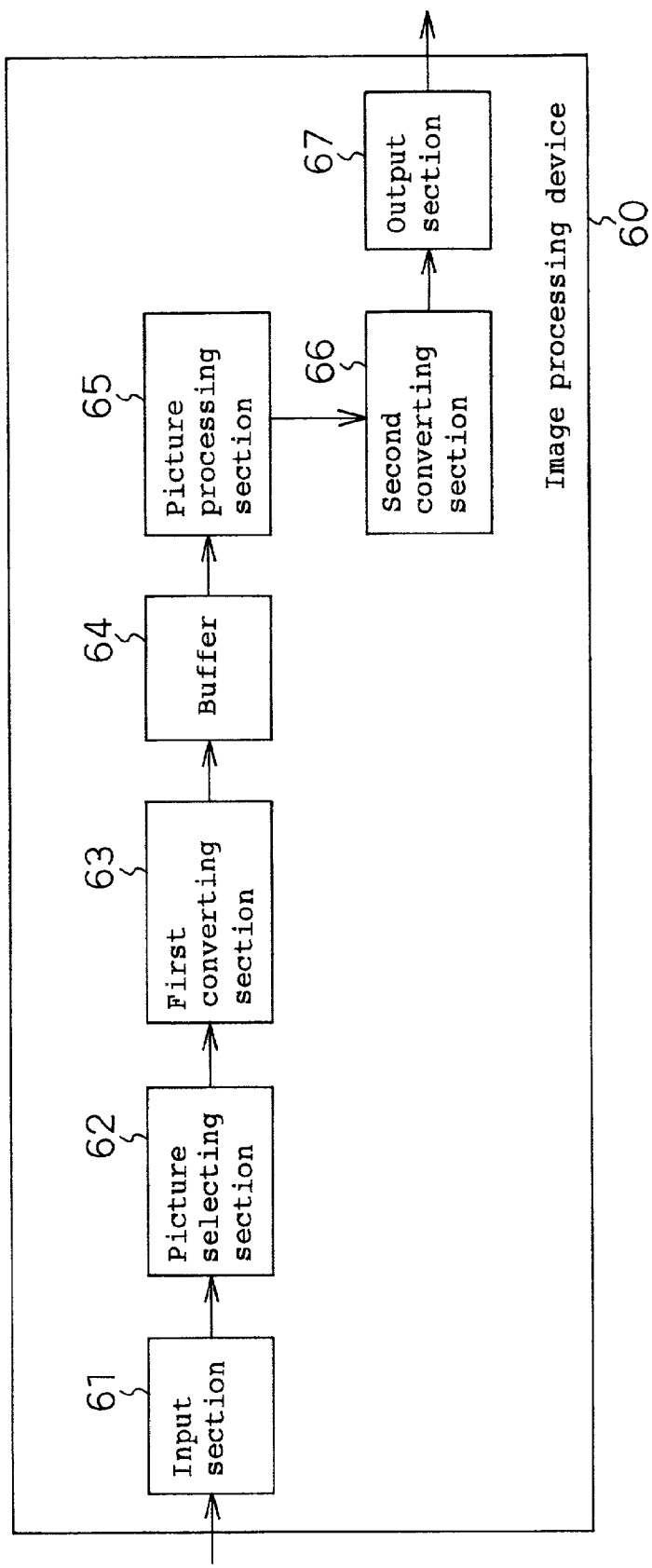
FIG. 5 is a block diagram showing the configuration of a conventional image processing device.
Figure 6:
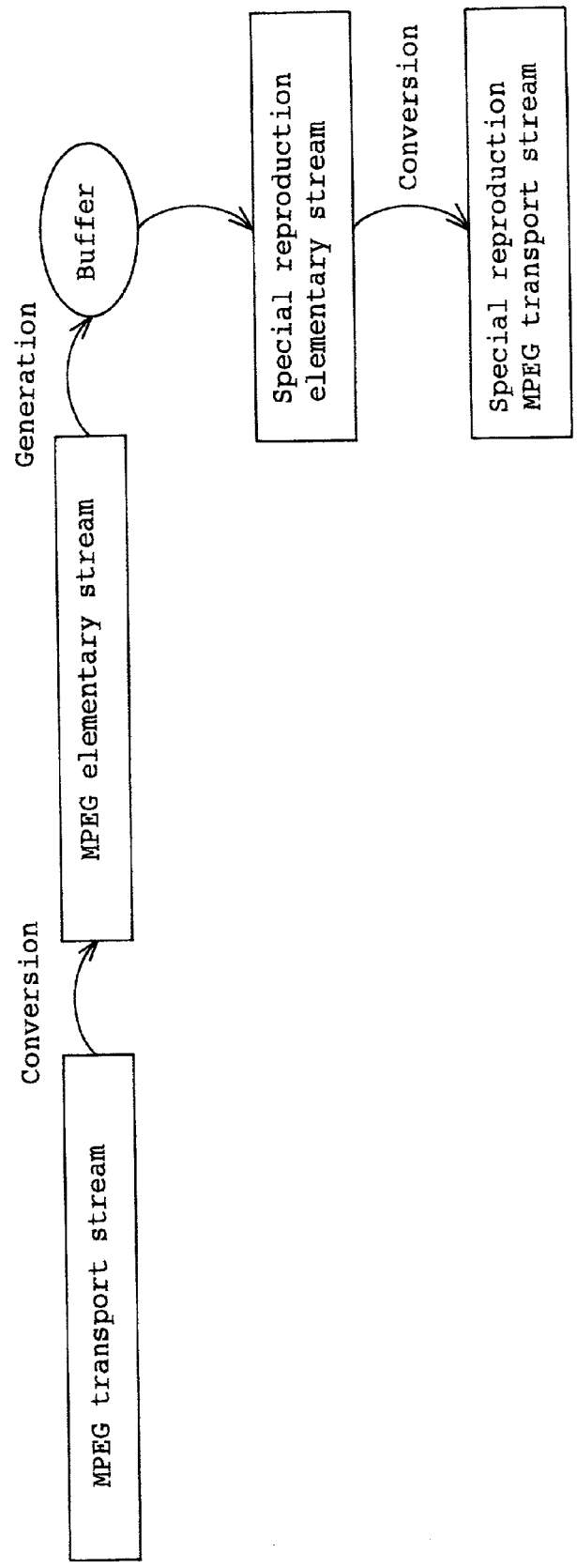
FIG. 6 is a diagram showing the steps of generating special reproduction data in the conventional image processing device.

FIG. 4 shows that a transport packet 37, which is stored in the first buffer 4 before processing, increases in picture information after processing, and the transport packet 37 is converted to a transport packet 40 and a transport packet 43. The transport packet 37 is a transport packet stored in the first buffer 4 before processing. Further, the transport packet 40 is a transport packet stored in the second buffer 7 after processing. The transport packet 43 is a transport packet additionally generated and stored in the third buffer 9. The increased TS generating section 8 fills dummy data such that the additional transport packet is 188 bytes in size. In FIG. 3, processing 23 represents the processing of the picture processing section 6 and the increased TS generating section 8.

Next, the transfer switch 10 outputs a transport packet from the second buffer 7. In the case where the third buffer 9 stores a transport packet, the transport packet is outputted after the transport packet stored in the second buffer 7 is outputted.

In response, the output section 11 outputs an MPEG transport stream for special reproduction to the outside of the image processing device 1. Processing 24 represents the processing of the transfer switch 10 and the output section 11.

If such an image processing device 1 is included in a digital VTR, it is possible to generate special reproduction data when the digital VTR records an MPEG transport stream. Moreover, if the image processing device 1 is included in a hard disk, it is possible to generate an MPEG transport stream for special reproduction when special reproduction is carried out on an MEPG transport stream recorded in the hard disk.

As earlier mentioned, the following will discuss what information is lost and what information is unnecessary or needs rewriting for special reproduction.

Firstly, PCR (Program Clock Reference) will be discussed. PCR is information for setting a value of STC (System Time Clock) at a value predetermined by an encoder. PCR is conveyed in addition to a transport packet at least every 100 ms. When the picture selecting section 3 selects a transport packet, PCR may be lost. In this case, PCR is added. Further, in the case of cue, a value of PCR is not useful, so that PCR is added or rewritten for special reproduction.

Next, PSI (Program Specific Information) will be discussed. PSI is information on program specification, which specifies a program to be selected and a packet to be extracted from an MPEG transport stream and what decoding is necessary. PSI is conveyed as a transport packet having specific PID. PSI is lost or oversupplied when the picture selecting section 3 selects a transport packet. Thus, in the case of special reproduction, it is necessary to totally remove original PSI information and to add a transport packet including PSI for special reproduction.

Moreover, a DSM (Digital Storage Media) flag will be discussed. The DSM flag is information indicative of being different from an original stream. In case of generating special reproduction data, the DSM flag is set at 1 and 1-byte DSM information is added.

Furthermore, PTS (Presentation Time Stamp) and DTS (Decoding Time Stamp) will be discussed. PTS is a time stamp for deciding a timing of reproducing and displaying a picture. PTS is added to the front end of picture data. Additionally, DTS is a time stamp for deciding a timing of decoding a picture. In the case where the order of decoding pictures is different from that of reproducing and displaying pictures, DTS is added to the front end of picture data. In the case of special reproduction such as cue, values of PTS and DTS are not useful, so that PTS and DTS need to be rewritten for special reproduction.

Additionally, a sequence header and a sequence end header will be discussed. The sequence header is indicative of the start of a program and the sequence end header is indicative of the end of the program. They need to be added because these are also lost when a transport packet is selected.

Also, a Broken_link bit will be discussed. A Broken_link bit is a signal indicative that a B picture cannot be precisely decoded from only a following I picture. In the case of special reproduction, an I or P picture referred by a B picture may be thinned out, so that the B picture may not be reproduced in an accurate manner. In this case, a Broken_link bit is set to indicate that the B picture cannot be precisely reproduced.

As described above, the image processing device 1 of this embodiment generates special reproduction data directly from an MPEG2 transport packet without converting an MPEG transport stream to an ES or PES to generate special reproduction data. Hence, it is less likely to lose information on a transmission line that is included in a header of a transport packet.

Further, it is possible to achieve a one-to-one correspondence between an inputted transport packet and an outputted transport packet except for additionally generated transport packets. Thus, special reproduction data can be generated using a buffer with a small capacity.

Additionally, as shown in FIG. 3, the image processing device 1 is operated by a pipeline processing as a whole, so that it is possible to readily change a transfer rate by changing a length of a pipeline.

Moreover, it is possible to achieve a one-to-one correspondence between an inputted transport packet and an outputted transport packet except for additionally generated transport packets. Hence, latency is substantially constant from the time a transport packet is inputted until the time the transport packet is outputted. Even when transport packets are additionally generated, since only several packets are increased and the frequency of increase is not high, latency is not seriously affected.

Here, in this embodiment, I pictures are selected to generate special reproduction data. The selection is not particularly limited. All or some of I pictures and P pictures may be selected for special reproduction. Further, all or some of P pictures may be selected for special reproduction. However, in the case where P pictures are selected to generate special reproduction data, a GOP header needs to be added because it may be lost when special reproduction data is generated.

Further, according to the foregoing description, the image processing device 1 of this embodiment generates special reproduction data by a pipeline processing. However, the processing is not particularly limited, so that special reproduction data may be generated without using a pipeline processing.

Moreover, regarding all or some of the means of the special reproduction data generating device of the present invention, all or some of the functions may be carried out like software by computer programs or by hardware.

Additionally, a medium as described below also belongs to the present invention: the medium has programs and/or data for allowing a computer to carry out all or some of the functions regarding all or some of the means of the special reproduction data generating device of the present invention, and the medium can be processed by a computer.

Also, an information aggregate as described below also belongs to the present invention: the information aggregate is programs and/or data for allowing a computer to carry out all or some of the functions regarding all or some of the means of the special reproduction data generating device of the present invention.

Furthermore, the data of the present invention includes a data structure, a data format, a data type and so on. Also, the medium of the present invention includes a recording medium such as ROM, a transmitting medium such as Internet, and a transmitting medium such as light, a radio wave, and a sound wave. Additionally, the medium belonging to the present invention includes a recording medium for recording programs and/or data and a transmitting medium for transmitting programs and/or data. Moreover, processability by a computer refers to readability by a computer in the case of a recording medium such as ROM. In the case of a transmitting medium, the processability means that programs and/or data to be transmitted can be processed by a computer as a result of transmission.

Further, a program-recording medium is readable by a computer. The program recording medium records programs and/or data for allowing a computer to carry out all or some of the functions regarding all or some of the means of the special reproduction data generating device of this embodiment. The program-recording medium may allow the read programs and/or data to carry out the functions by cooperating with the computer.

Additionally, the information aggregate of the present invention includes software such as programs and/or data.

Moreover, a transmitting medium, which transmits an MPEG transport stream generated in the special reproduction data generating device of the present invention, also belongs to the present invention.

Also, a recording medium, which records an MPEG transport stream generated in the special reproduction data generating device of the present invention, also belongs to the present invention.

According to the foregoing description, the present invention can provide a special reproduction data generating device, a medium, and an information aggregate, by which information on a transmission line is not lost. The information is included in an original MPEG transport stream from which special reproduction data is generated.

Moreover, according to the present invention, it is possible to provide a special reproduction data generating device, a medium, and an information aggregate that do not require a large-capacity buffer to generate special reproduction data.

Further, according to the present invention, it is possible to provide a special reproduction data generating device, a medium, and an information aggregate that can readily change a transfer rate of an MPEG transport stream outputted as special reproduction data.

Furthermore, according to the present invention, it is possible to provide a special reproduction data generating device, a medium, and an information aggregate that achieve a small change in latency from the time when an MPEG transport stream is inputted to the time when special reproduction data is outputted.

What is claimed is:

1. A special reproduction data generating device, comprising:
    input means of inputting an MPEG transport stream;
    special reproduction data generating means of directly generating special reproduction data by selecting a transport packet including data of a predetermined kind of frame from transport packets of the MPEG transport stream, without converting the inputted MPEG transport stream to an ES (elementary stream) or PES (packetized elementary stream), the special reproduction data generating means correcting a mismatching MPEG format so as to generate the special reproduction data; and
    output means of outputting the special reproduction data as an MPEG transport stream,
    wherein the special reproduction generating means adds necessary data for special reproduction to the selected transport packet or, if necessary data is not added to the selected transport packet, inserts another transport packet before or after the selected transport packet, the necessary data being stored in the selected transport packet or in the additionally inserted transport packet, and
    if the necessary data is stored in the selected transport packet and the another transport packet is inserted, the additionally inserted transport packet stores data which cannot be stored in the selected transport packet.

2. The special reproduction data generating device according to claim 1, wherein the special reproduction data generating means adds a Presentation Time Stamp (PTS), to the selected transport packet.

3. The special reproduction data generating device according to claim 2, wherein the special reproduction data generating means adds a Decoding Time Stamp (DTS) to the selected transport packet.

4. The special reproduction data generating device according to claim 2 or 3, wherein said special reproduction data generating means sets a Broken_link bit for the selected transport packet.

5. The special reproduction data generating device according to any one of claims 2 or 3, wherein if the selected transport packet includes unnecessary data for special reproduction, the unnecessary data is defined as a padding byte and formed into dummy data.

6. The special reproduction data generating device according to claim 5, wherein the unnecessary data is at least one of data of a frame other than the predetermined kind of frame, and DIT, PCR, PSI, DSM flag, PTS, DTS, and data of an AC coefficient of a macro block that are added to the inputted MPEG transport stream.

7. The special reproduction data generating device according to any one of claims 2 or 3, wherein if the necessary data for special reproduction is added to the selected transport packet but a value thereof is incompatible, the value is corrected.

8. The special reproduction data generating device according to claim 1, wherein the necessary data is at least one of PCR, PSI, a DSM flag, PTS, DTS, a sequence header code, a sequence end code, a GOP header, a Broken_link bit that are provide for the special reproduction.

9. The special reproduction data generating device according to any one of claims 1 to 3, wherein the predetermined frame is an I picture.

10. The special reproduction data generating device according to any one of claims 1 to 3, wherein the predetermined frame is at least one picture selected from an I picture, a P picture, and a B picture.

11. A medium storing a program and/or data for allowing a computer to carry out all or some functions of all or some means of the special reproduction data generating device according to any one of claims 1 to 3, the medium being processible by a computer.

12. An information aggregate comprising a program and/or data for allowing a computer to carry out all or some functions of all or some means of the special reproduction data generating device according to any one of claims 1 to 3.

13. A transmitting medium for transmitting an MPEG transport stream generated in the special reproduction data generating device according to any one of claims 1 to 3.

14. A recording medium for recording an MPEG transport stream generated in the special reproduction data generating device according to any one of claims 1 to 3.

15. A method of processing an MPEG data packet for special reproduction comprising the steps of:
(a) receiving multiple MPEG data packets;
(b) selecting for the special reproduction a data packet from among the multiple data packets received in step (a); and
(c) processing the selected data packet for the special reproduction without converting the multiple MPEG data packets received in step (a) into an elementary stream (ES) and without converting the multiple MPEG data packets received in step (a) into a packetized elementary stream (PES), the step of processing corrects a mismatching MPEG format, wherein the step of processing adds necessary data for special reproduction to the selected data packet or, if necessary data is not added to the selected data packet, inserts another data packet before or after the selected data packet, the necessary data being stored in the selected data packet or in the additionally inserted data packet, and if the necessary data is stored in the selected data packet and the another data packet is inserted, the additionally inserted data packet stores data which cannot be stored in the selected data packet.

* * * * *